(12) United States Patent
Shintani et al.

(10) Patent No.: US 11,470,281 B2
(45) Date of Patent: Oct. 11, 2022

(54) RENDERING CON PENT ON DISPLAYS IN LIVING ENVIRONMENT BASED ON ENVIRONMENT OUTSIDE LIVING ENVIRONMENT

(71) Applicant: SONY GROUP CORPORATION, Tokyo (JP)

(72) Inventors: Peter Shintani, San Diego, CA (US); Christopher Scott Szabo, San Diego, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/156,060

(22) Filed: Jan. 22, 2021

(65) Prior Publication Data
US 2022/0239867 A1    Jul. 28, 2022

(51) Int. Cl.
| | |
|---|---|
| H04N 7/18 | (2006.01) |
| G06T 7/20 | (2017.01) |
| G06T 7/70 | (2017.01) |
| H04N 5/232 | (2006.01) |
| H04N 5/63 | (2006.01) |
| G06F 3/16 | (2006.01) |
| H04R 1/40 | (2006.01) |

(Continued)

(52) U.S. Cl.
CPC ............. *H04N 7/181* (2013.01); *G05B 15/02* (2013.01); *G06F 3/165* (2013.01); *G06T 7/20* (2013.01); *G06T 7/70* (2017.01); *G06V 20/00* (2022.01); *G06V 40/161* (2022.01); *H04N 5/23203* (2013.01); *H04N 5/23219* (2013.01); *H04N 5/63* (2013.01); *H04R 1/406* (2013.01); *H04R 3/005* (2013.01); *G06T 2207/30201* (2013.01)

(58) Field of Classification Search
None
See application file for complete search history.

(56) References Cited

U.S. PATENT DOCUMENTS

| | | |
|---|---|---|
| 10,171,261 B2 | 1/2019 | Warren |
| 10,375,320 B2 | 8/2019 | Basso |

(Continued)

OTHER PUBLICATIONS

Nagpal, et al., "Windowless Airplanes: A boon to Air Transportation", Gyancity Journal of Engineering and Technology, vol. 3, No. 2, Jul. 2017, pp. 17-22.

*Primary Examiner* — James M Anderson, II
(74) *Attorney, Agent, or Firm* — Chip Law Group

(57) ABSTRACT

An electronic device and method for rendering content on displays in a living environment based on environment outside the living environment is provided. The electronic device receives first images of a living environment from a first image capturing device positioned inside the living environment and detects a facial region of a user based on the received first images. The electronic device tracks a head position or an eye gaze of the user based on the detected facial region and selects a second image capturing device from a plurality of image capturing devices. The plurality of image capturing devices is coupled with the electronic device and is positioned outside the living environment. The electronic device receives second images from the selected second image capturing device and controls a display screen, associated with the electronic device and inside the living environment, to display the received second images.

19 Claims, 6 Drawing Sheets

(51) Int. Cl.
  *H04R 3/00*   (2006.01)
  *G05B 15/02*  (2006.01)
  *G06V 20/00*  (2022.01)
  *G06V 40/16*  (2022.01)

(56) References Cited

U.S. PATENT DOCUMENTS

| | | |
|---|---|---|
| 2005/0044511 A1 | 2/2005 | Jong |
| 2011/0069158 A1* | 3/2011 | Shiloh .................... H04N 7/181 |
| | | 348/61 |
| 2017/0280124 A1 | 9/2017 | Ahlborn |
| 2017/0286037 A1 | 10/2017 | Sizelove |
| 2018/0367751 A1* | 12/2018 | Devendran ............ H04N 5/225 |
| 2019/0122638 A1* | 4/2019 | Anderson ............... G06F 3/147 |
| 2020/0073122 A1* | 3/2020 | Rothkopf ............. G02B 27/017 |

* cited by examiner

RENDERING CONTENT ON DISPLAYS IN LIVING ENVIRONMENT BASED ON ENVIRONMENT OUTSIDE LIVING ENVIRONMENT

CROSS-REFERENCE TO RELATED APPLICATIONS/INCORPORATION BY

None.

FIELD

Various embodiments of the disclosure relate to display technology and home automation. More specifically, various embodiments of the disclosure relate to rendering content on displays in a living environment based on environment outside the living environment.

BACKGROUND

Advancements in display technology and home automation have provided various ways to use display device(s) inside a living environment, such as home or office space. For example, there has been a shift in the way televisions have been used traditionally in homes. Many users prefer to use their television as a digital wallpaper, a shift from traditional broadcast or content streaming to art and aesthetics. Depending on user needs, there may be other possible ways to use a display in a living environment.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for rendering content on displays in a living environment based on environment outside the living environment is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed electronic device and method for control of the electronic device to render media content based on an outside environment. Exemplary aspects of the disclosure provide an electronic device (for example, a television (TV)) which may control a display screen associated with the electronic device inside a living environment. For example, the living environment may be a residential space (such as an apartment or a house), a commercial space (such as an office space, a hotel room, or a concert hall), a particular room or space in a residential space or a commercial space, and the like.

At any time-instant, the electronic device may be configured to track a head position or an eye gaze of a user present in the living environment, based on a facial region detected from one or more images of the living environment. Such images may be received from a first image capturing device (for example, a closed-circuit television (CCTV) camera or other image capturing devices) coupled with the electronic device. The first image capturing device may be inside the living environment. For example, the first image capturing device may be a wall-mounted camera or may be an integrated camera unit of the electronic device. Based on the tracked head position and/or the eye gaze, the electronic device may select a second image capturing device from a plurality of image capturing devices. For example, the user may be facing a specific direction or may be looking in a particular direction and the electronic device may select the second image capturing device (for example, a CCTV camera) which may be outside the living environment in the direction which matches a facing direction, field-of-view (FoV), or a line of sight of the user.

The electronic device may be configured to receive images from the selected second image capturing device and control the display screen to display the received images. In some living environments, people living or staying there may not have a window or may not be able to open a window, for example, if view outside is not good or light is very bright. In some instances, even if a window is available, it may be at an undesired side of the living environment. For example, there may be a window at the west side, but view of the east side may be better. To address this issue, the disclosed electronic device (along with the display screen) may operate as an artificial or a digital window to provide a view of an outside environment. Also, by tracking the head position or eye gaze, the electronic device may dynamically select and control a display screen in the living environment to display a view (i.e. a live or a recorded image/video feed) of the outside environment.

Figure 1:
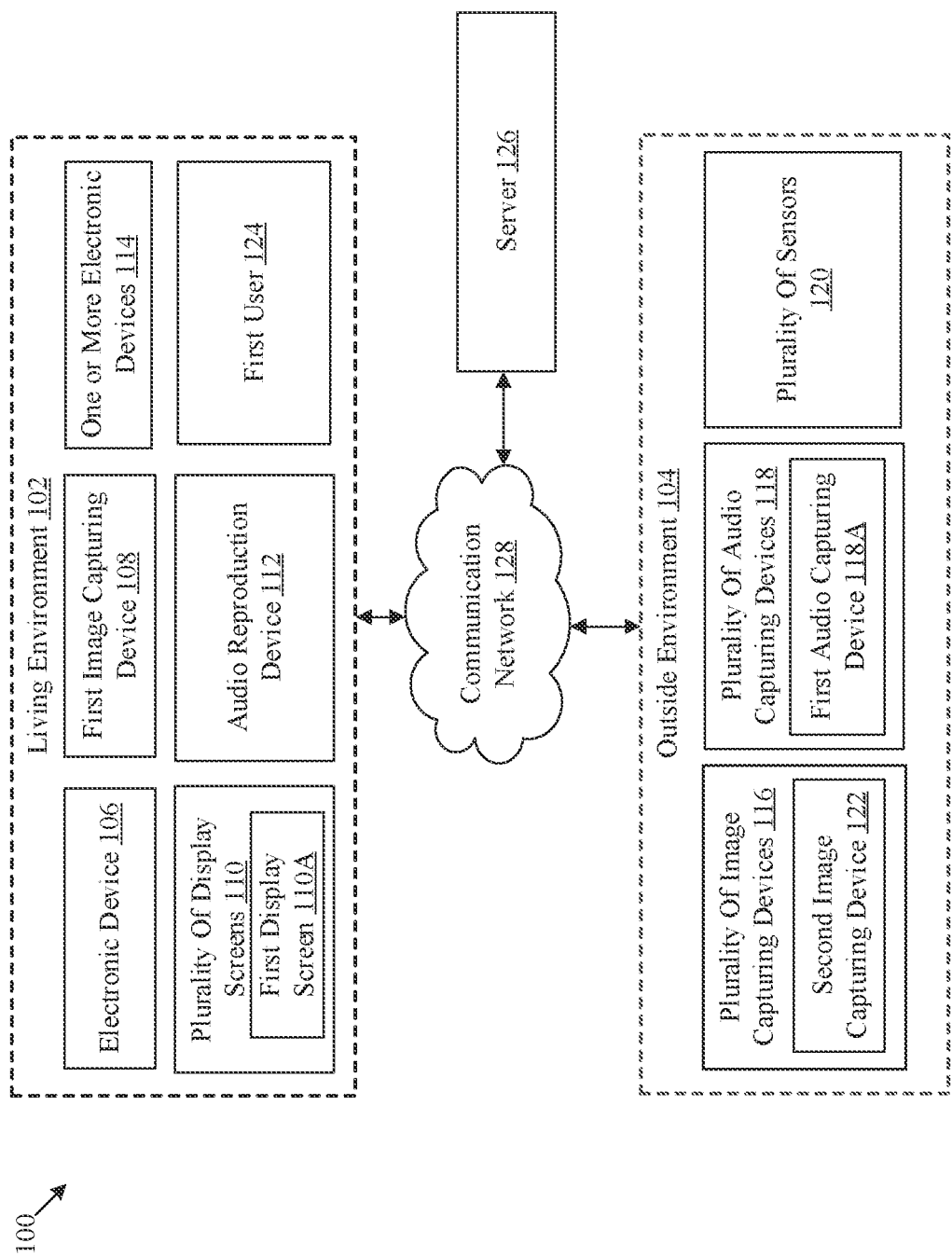
FIG. 1 is a block diagram that illustrates an exemplary environment for rendering content on displays in a living environment based on environment outside the living environment, in accordance with an embodiment of the disclosure.

FIG. 1 is a block diagram that illustrates an exemplary environment for rendering content on displays in a living environment based on environment outside the living environment, in accordance with an embodiment of the disclosure. With reference to FIG. 1, there is shown a diagram of an environment 100. The environment 100 includes a living environment 102 and an outside environment 104. In the living environment 102, there is shown an electronic device 106, a first image capturing device 108, a plurality of display screens 110, an audio reproduction device 112, and one or more electronic devices 114. In the outside environment 104, there is shown a plurality of image capturing devices 116, a plurality of audio capturing devices 118, and a plurality of sensors 120. The plurality of image capturing devices 116 may include a second image capturing device 122, for example. A first user 124 is also shown inside the living environment 102.

In FIG. 1, the electronic device 106, the first image capturing device 108, the plurality of display screens 110, the audio reproduction device 112, and the one or more electronic devices 114 are shown as separate devices. In some embodiments, the entire functionalities of at least one of the first image capturing device 108, the plurality of display screens 110, the audio reproduction device 112, or the one or more electronic devices 114 may be incorporated in the electronic device 106, without deviating from scope of the disclosure. In the environment 100, there is further shown a server 126 which may be communicatively coupled with the electronic device 106 and/or other devices in the environment 100, via a communication network 128.

The living environment 102 may be a built environment which may be offered to people who may perform various kinds of social, cultural, religious, economic, or political activities. Examples of the living environment 102 may include, but are not limited to, a residential space (such as an apartment or a house), a commercial space (such as an office space, a hotel room, or a concert hall), or a particular room or space in a residential space or a commercial space. The outside environment 102 may be any physical space outside the living environment 102. Examples of the outside environment 102 may include, but are not limited to, a terrace, a roof, a balcony, a garden, a park, roads, woods, sky, or a combination thereof.

The electronic device 106 may include suitable logic, circuitry, and/or interfaces that may be configured to control one or more display screens (from among the plurality of display screens 110) to display one or more images of a view outside the living environment 102. Such images may be acquired by an image capturing device (such as the second image capturing device 122).

In an embodiment, the electronic device 106 may be disposed or mounted on any support fixture or support structure (for example, a wall, a roof, a door, a ceiling, and the like) of the living environment 102. In an operational state, the electronic device 106, together with a display screen, may appear to be an opening or may imitate a function of an opening (for example, a window) to a view outside the living environment 102. To appear or function as an opening in a non-operational state, the electronic device (together with a display screen) may be disposed or mounted inside or over an opening in the living environment 102. In such a case, the display screen may be implemented as a see-through or a semi-transparent or translucent display.

In an embodiment, a display screen may be integrated into the electronic device 106. The size of the display screen should be enough to match a typical size of an opening, such as a window, a door, or a skylight. Examples of such an implementation of the electronic device 106 may include, but are not limited to, a television (TV), a display monitor or a computer monitor, a digital signage, a digital mirror (or a smart mirror), a video wall (which consists of two or more displays tiled together contiguously or overlapped in order to form one large screen).

In another embodiment, the electronic device 106 may communicate with one or more display screens, through a suitable network or I/O (Input/Output) interface. Examples of such an implementation of the electronic device 106 may include, but are not limited to, a mobile phone, a smart phone, a tablet computing device, a personal computer, a projector, a gaming console, a media player, a sound system, a set-top box or a Digital TV receiver, a smart audio device, a home theatre system, a digital camera, or other consumer electronic device with media rendering and sharing capability.

The first image capturing device 108 may include suitable logic, circuitry, code, and/or interfaces that may be configured to capture one or more first images of the living environment 102. In an embodiment, the first image capturing device 108 may detect a first facial region of the first user 124 present in the living environment 102 based on the captured one or more first images. In another embodiment, the first image capturing device 108 may transmit the captured one or more first images to the electronic device 106, which may detect the first facial region of the first user 124. The detection may be based on one or more image processing techniques, such as face detection methods, object detection methods, deep learning methods, and other methods which may be known to one ordinarily skilled in the art.

In an embodiment, the first image capturing device 108 may be disposed, mounted, or affixed to any fixture or support structure in the living environment 102. In another embodiment, the first image capturing device 108 may be integrated into the electronic device 106 or a display screen coupled with the electronic device 106. Examples of the first image capturing device 108 may include, but are not limited to, an image sensor, a wide-angle camera, an action camera, a closed-circuit television (CCTV) camera, a camcorder, a digital camera, a camera phone, a camera drone, a camera unit integrated into a robot (for example, a robot dog, a cleaning robot, an attendant robot, and the like), or a camera unit integrated into any consumer electronic device (such as, but not limited to a refrigerator, a light fixture, a personal computer, or an indoor security device).

The plurality of display screens 110 may include suitable logic, circuitry, and interfaces that may be configured to display an output of the electronic device 106. The plurality of display screens 110 may be utilized to display one or more second images captured from the selected second image capturing device 122. In some embodiments, the plurality of display screens 110 may be an external display screen associated with the electronic device 106. The plurality of display screens 110 may be a touch screen which may enable the user (such as the first user 124) to provide a user-input, via the plurality of display screens 110, in order to select an operational mode of the electronic device 106. Each of the plurality of display screens 110 may be realized through one of several known technologies, such as, but not limited to, a Liquid Crystal Display (LCD) display, a Light Emitting Diode (LED) display, a plasma display, or an Organic LED (OLED) display technology. In an embodiment, each of the plurality of display screens 110 may be one of a see-through display, a semi-transparent or translucent display, or a display with variable transparency (i.e. transparency can be electronically controlled).

The audio reproduction device 112 may include suitable logic, circuitry, and/or interfaces that may be configured to reproduce audio. The audio reproduction device 112 may receive electrical signals or instructions (i.e. related to the audio) from an audio source (such as, but not limited to, the plurality of audio capturing devices 118 or a server) and may convert the received electrical signals or instructions into an audio output. The audio reproduction device 112 may be associated with the electronic device 106.

In an embodiment, the audio reproduction device 112 may be integrated into the electronic device 106. In such an implementation, the plurality of audio capturing devices 118 may form an internal component of the electronic device 106. In some embodiments, the plurality of audio capturing devices 118 may be communicatively coupled with the electronic device 106 and may be positioned inside the living environment 102. Examples of the audio reproduction device 112 may include, but are not limited to, a surround sound system with a particular speaker layout (for example, an M:N layout with M speakers and N sub-woofers), an external wireless speaker, an internal speaker, an external wired speaker, a woofer, a sub-woofer, a tweeter, a loudspeaker, a monitor speaker, an optical audio device, or a sound output device that may be communicatively coupled to the electronic device 106 through the communication network 128 or integrated into the electronic device 106.

Each electronic device of the one or more electronic devices 114 may include suitable logic, circuitry, and/or interfaces that may be configured to function based on control instructions from the electronic device 106. Such instructions may be communicated to the one or more electronic devices 114 based on environment information associated with an environment (such as the outside environment 104) outside the living environment 102. The environment information may include, for example, luminous intensity information, temperature information, or air flow information. Such information may be received from the plurality of sensors 120. In an embodiment, the one or more electronic devices 114 may be coupled with the electronic device 106 and may be positioned in the living environment 102. Examples of each of the one or more electronic devices 114 may include, but are not limited to, a lighting device, an electric fan, or an air conditioner system, an electric heater, a thermostat device, an aroma diffuser device, an audio/video reproduction device, a Heating Ventilation and Air-Conditioning (HVAC) system, or other consumer electronic devices.

Each of the plurality of image capturing devices 116 may include suitable logic, circuitry, code, and/or interfaces that may be configured to capture one or more second images of the outside environment 104 from a specific camera viewpoint and/or a camera location. Examples of the plurality of image capturing devices 116 may include, but are not limited to, an image sensor, a wide-angle camera, an action camera, a CCTV camera, a camcorder, a digital camera, camera phones, a camera drone, a time-of-flight camera (ToF camera), a night-vision camera, and/or other image capture devices.

The plurality of image capturing devices 116 may be positioned outside the living environment 102 (such as the outside environment 104). In an embodiment, at least one of the plurality of image capturing devices 116 may be disposed, mounted, or affixed to a particular location on a support structure, which may be a part of the living environment 102 or may be placed nearby (such as near a house gate, a boundary wall, or a fence around the living environment 102). For example, if the support structure is a wall or a roof of a house, then the particular location may be on a side of the wall or the roof which faces the outside environment 104. In an embodiment, at least one of the plurality of image capturing devices 116 may be disposed, mounted, or affixed, on the same portion of the support structure (such as a wall) on which a display screen may be placed so as to match a view or perspective of a window. In such an implementation, both the display screen and the image capturing device may be placed on the same portion of the support structure, but while the former may be inside the living environment 102, the latter may be outside the living environment 102.

Each of the plurality of audio capturing devices 118 may include suitable logic, circuitry, code and/or interfaces that may be configured to capture a first audio present in an environment outside the living environment 102. The plurality of audio capturing devices 118 may generate first audio information associated with the captured first audio from the plurality of audio capturing devices 118. Examples of the plurality of audio capturing devices 118 may include, but are not limited to, an electret microphone, a dynamic microphone, a carbon microphone, a piezoelectric microphone, a fiber microphone, a micro-electro-mechanical-systems (MEMS) microphone, or other microphones.

The plurality of sensors 120 may include suitable logic, circuitry, code, and/or interfaces that may be configured to generate environment information associated with an environment (such as the outside environment 104) outside the living environment 102. The environment information may include, for example, luminous intensity information, temperature information, air flow information, and the like. The plurality of sensors 120 may be further configured to transmit the environment information to the electronic device 106. The plurality of sensors 120 may include, for example, one or more of an Infra-red sensor, a radio-frequency identification (RFID) sensor, a motion sensor, a temperature sensor, an ultrasonic sensor, an air flow sensor, a light sensor, and the like. Details related to the plurality of sensors 120 are described, for example, in FIG. 3A.

The server 126 may include suitable logic, circuitry, code, and/or interfaces that may be configured to transmit media content to the electronic device 106. In some embodiments, the server 126 may be configured to store and communicate the environment information to the electronic device 106, which may control the operation of one or more electronic devices 114 in the living environment 102. The server 126 may execute operations through web applications, cloud applications, HTTP requests, repository operations, file transfer, and the like. Example implementations of the server 126 may include, but are not limited to, a database server, a file server, a web server, a media server, an application server, a mainframe server, or a cloud server.

The communication network 128 may include a communication medium through which the electronic device 106, the living environment 102, the outside environment 104, and the server 126 may communicate with each other. The communication network 128 may be one of a wired connection or a wireless connection Examples of the communication network 128 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 128 in accordance with various wired and wireless communication protocols. Examples of such wired and wireless communication protocols may include, but are not limited to, at least one of $4^{th}$ Generation Long-Term Evolution (LTE), $5^{th}$ Generation New Radio (NR), a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 106 may be configured to execute a workflow to control display screen(s) to display image(s) or video of a view outside the living environment 102. The execution of such a workflow may be based on a detection of an event, a schedule, or a user input. For example, the event may be related to a weather situation (such as if there is a snowfall or if it rains), a social meeting or gathering (such as party or a dinner), or time-dependent situations (such as sunrise, sunset, full moon, eclipse). Also, a user may schedule the execution of the workflow to a particular date-time. The workflow is described briefly herein.

The electronic device 106 may be configured to receive one or more first images of the living environment 102 from the first image capturing device 108, which may be coupled with the electronic device 106 and positioned inside the living environment 102. Such images of the living environment 102 may include a plurality of objects (such as display screens, furniture items, decorative items, or user(s)). At any time-instant, the electronic device 106 may be configured to detect a first facial region of the first user 124 in the living environment 102, based on the received one or more first images. The electronic device 106 may detect the first facial region of the first user 124 based on different image processing techniques, such as, but not limited to a face detection method, an object detection method, a deep learning model, or other image processing methods, as described, for example, in FIG. 3A.

The electronic device 106 may be configured to track at least one of a first head position or a first eye gaze of the first user 124 based on the detected first facial region. For example, the first head position or the first eye gaze may be tracked to identify a particular location or a device at which (or a particular direction along which) the first user 124 may look at or turn towards, while the first user 124 is present in the living environment 102. Based on the tracking of the first head position and/or the first eye gaze, the electronic device 106 may be configured to select the second image capturing device 122 from the plurality of image capturing devices 116 (as described, for example, in FIG. 3A). The plurality of image capturing devices 116 may be positioned outside the living environment 102 (such as the outside environment 104).

In some embodiments, based on the first head position or the first eye gaze, the electronic device 106 may determine a location, a region, or a physical structure at which the first user 124 may be looking at or may have turned their head towards in the living environment 102. The selection of the second image capturing device 122 may be done based on whether a display screen is available at or is present close to the location, the region, or the physical structure in the living environment 102. In these or other embodiments, the second image capturing device 122 may be selected based on a determination that the relative distance of the second image capturing device 122, among the plurality of image capturing devices 116, is a minimum with respect to the location, the region, or the physical structure. For example, if the first user 124 looks at a television screen on the right wall, a camera placed outside the home and closest to the television screen may be selected.

The electronic device 106 may receive one or more second images from the selected second image capturing device 122 and may control a display screen (such as the first display screen 110A) associated with the electronic device 106 to display the received one or more second images. Such images may include a view of the outside environment 104. By tracking the head position or eye gaze, the disclosed electronic device 106 may be able to automatically select and control one of several display screens in the living environment 102 to display the images of the outside environment 104.

Figure 2:
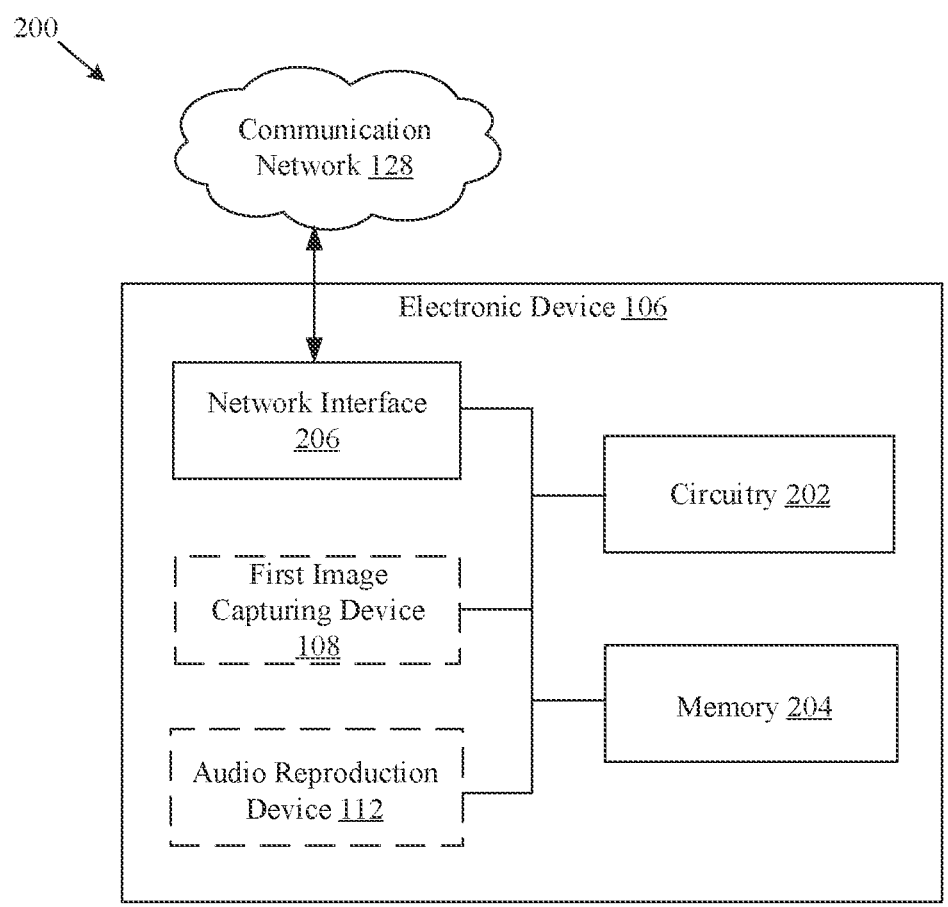
FIG. 2 is a block diagram that illustrates an exemplary electronic device for rendering content on displays in a living environment based on environment outside the living environment, in accordance with an embodiment of the disclosure.

FIG. 2 is a block diagram that illustrates an exemplary electronic device for rendering content on displays in a living environment based on environment outside the living environment, in accordance with an embodiment of the disclosure. FIG. 2 is explained in conjunction with elements from FIG. 1. With reference to FIG. 2, there is shown a block diagram 200 of the electronic device 106. The electronic device 106 may include circuitry 202 and a memory 204. In some embodiments, the electronic device 106 may also include an image capturing device (such as the first image capturing device 108), a display screen (such as the plurality of display screens 110), and/or the audio reproduction device 112. Further, the electronic device 106 may include a network interface 206, through which the electronic device 106 may be connected to the communication network 128.

The circuitry 202 may include suitable logic, circuitry, interfaces, and/or code that may be configured to execute program instructions associated with different operations to be executed by the electronic device 106. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store the program instructions to be executed by the circuitry 202. In some embodiments, the memory 204 may be configured to also store images of the living environment or the outside environment and environment information related to the outside environment. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may include suitable logic, circuitry, interfaces, and/or code that may be configured to facilitate communication between the electronic device 106, the living environment 102, the outside environment 104, and the server 126, via the communication network 128. The network interface 206 may be implemented by use of various known technologies to support wired or wireless communication of the electronic device 106 with the communication network 128. The network interface 206 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 206 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 4G LTE, 5G NR, code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX).

A person of ordinary skill in the art will understand that the electronic device 106 in FIG. 2 may include other suitable components or systems, in addition to the components or systems which are illustrated herein to describe and explain the function and operation of the present disclosure. A detailed description for the other components or systems of the electronic device 106 has been omitted from the disclosure for the sake of brevity. Operations of the circuitry 202 are further described, for example, in FIGS. 3A, 3B, and 4.

Figure 3A:
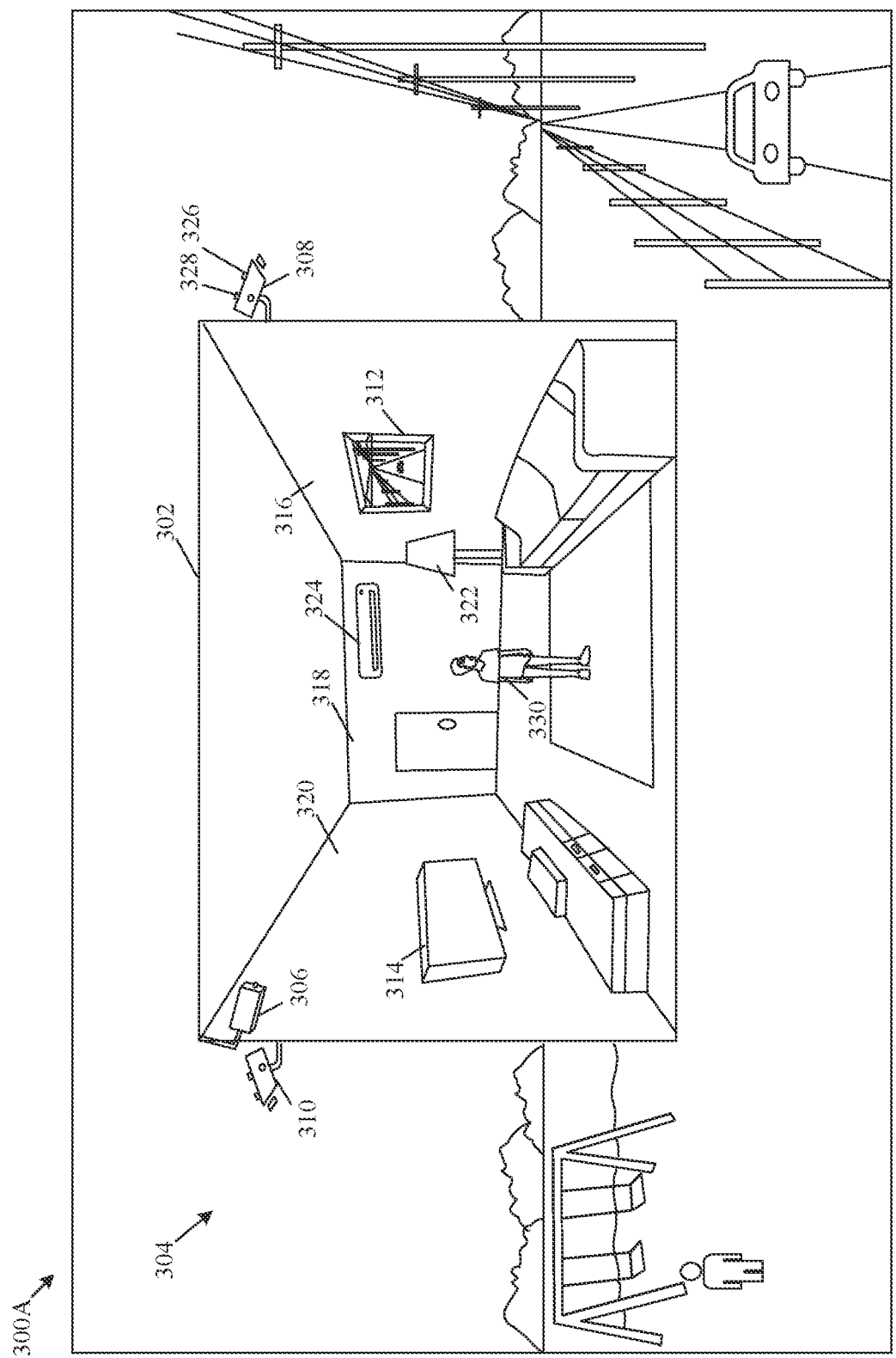
FIG. 3A is a diagram that illustrates an exemplary scenario for rendering content on displays in a living environment based on an environment outside the living environment, in accordance with an embodiment of the disclosure.

FIG. 3A is a diagram that illustrates an exemplary scenario for rendering content on displays in a living environment based on an environment outside the living environment, in accordance with an embodiment of the disclosure. FIG. 3A is explained in conjunction with elements from FIGS. 1 and 2. With reference to FIG. 3A, there is shown an exemplary scenario 300A. In the exemplary scenario 300A, there is shown a room 302 and an outside environment 304, which may be respective examples of the living environment 102 and the outside environment 104. There is further shown a first image capturing device 306, which may be an exemplary implementation of the first image capturing device 108 of FIG. 1. There is further shown a plurality of image capturing devices (such as a second image capturing device 308 and a third image capturing device 310). There is further shown a plurality of display screens (such as a first display screen 312 and a second display screen 314), which may be an exemplary implementation of the plurality of display screens 110. There are further shown one or more electronic devices (such as a lighting device 322 and an air conditioner 324) which may be an exemplary implementation of the one or more electronic devices 114. There is further shown a plurality of sensors (such as a temperature sensor 328 and a light sensor 326) which may be an exemplary implementation of the plurality of sensors 120.

In the scenario 300A, there are further shown walls 316,318, and 320 enclosing the room 302. There is further shown a first user 330 standing in proximity of the first display screen 312 located within the room 302 and facing towards the wall 316. It should be noted that the lighting device 322 and the air conditioner 324 are merely examples. The scenario 300A may include other types of electronic devices, without a deviation from the scope of the disclosure. It should be also noted that the temperature sensor 328 and the light sensor 326 are merely examples. The scenario 300A may include other types of sensors, without a deviation from the scope of the disclosure.

At any time-instant, the circuitry 202 may be configured to receive one or more first images of the room 302 from the first image capturing device 306 (which may be coupled with the electronic device 106 and positioned inside the room 302). The first image capturing device 306 may be configured to capture an image or a plurality of images of the room 302. In an embodiment, the first image capturing device 306 may be configured to detect, as an object detection result, a plurality of objects (such as a furniture item, a decorative item, or a user) present in the room 302 based on the captured image or the plurality of images. In an embodiment, the first image capturing device 306 may transmit the captured images and the object detection result to the circuitry 202, which may determine the plurality of objects in the room 302.

The circuitry 202 may be configured to detect a first facial region of the first user 330 present in the room 302 based on the received one or more first images. In an embodiment, the circuitry 202 may detect the first facial region of the first user 330 in the received one or more first images based on image processing techniques, such as, but not limited to, face detection methods, object detection methods, deep learning methods, and other image processing methods. Based on the detected first facial region, the circuitry 202 may be configured to track at least one of a first head position or a first eye gaze of the first user 330. The first head position or the first eye gaze may be tracked based on the detected first facial region in the received one or more images of the room 302. At a particular time instant, the first head position or the first eye gaze may point to a location or region in the room 302, where the first user 330 may be looking or staring at. For example, the first head position may relate to an orientation of user's head in terms of a particular yaw, roll, or pitch. Specifically, in some cases, the first head position may be determined in terms of positions, such as a straight face position, a downfacing position, an upward facing position, a face orientation towards right or left of the body or above shoulder.

In an embodiment, the circuitry 202 may be configured to determine a first viewing direction of the first user 330 based on at least one of the tracked first head position or the first eye gaze. The viewing direction may be towards a wall (such as the walls 316,318, and 320) of the room 302 and the selected second image capturing device may be positioned on the wall. For example, in the scenario 300A, at least one of the tracked first head position or first eye gaze may point towards the wall 316 of the room 302. In an embodiment, the viewing direction of the first user 330 may be determined based on the first head position associated with the first user 330. The viewing direction may change due a change in the head position. In some scenarios, the viewing direction of the first user 330 may be determined based on the first eye gaze of the first user 330. The viewing direction may change due a change in the first eye gaze, while the first head position may or may not remain unaltered. For example, at a first time instant, the first head position of the first user 330 may be straight and the first eye gaze may be towards a left corner of the wall 316. The second image capturing device 308 may capture one or more second images of the outside environment 104 based on a viewpoint associated with the first head position and the first eye gaze at the first time instant.

In an embodiment, the circuitry 202 may be further configured to select the first display screen 312 from a plurality of display screens (in the living environment) based on at least one of the tracked first head position or the first eye gaze of the first user 330. For example, in the scenario 300A, the first head position or the first eye gaze is shown to be towards the wall 316 of the room 302. In this case, the first display screen 312 may be selected.

Based on at least one of the tracked first head position or the first eye gaze, the circuitry 202 may be configured to select a second image capturing device from a plurality of image capturing devices (such as the second image capturing device 308 and the third image capturing device 310). The plurality of image capturing devices is positioned outside the room 302 (such as in the outside environment 304). For example, if the first head position or the first eye gaze is towards the wall 316 of the room 302, then the circuitry 202 may select the second image capturing device 308 positioned outside the wall 316.

The circuitry 202 may be configured to receive one or more second images from the selected second image capturing device 308. Such images may include a view of the outside environment 304 captured by the selected second image capturing device 308. In an embodiment, based on at least one of tracked first head position or first eye gaze of the first user 330, the circuitry 202 may be further configured to control the selected second image capturing device 308 to capture the one or more second images of an environment outside to the room 302. Thereafter, the circuitry 202 may be configured to control the selected first display screen 312 associated with the electronic device 106 to display the received one or more second images.

In an embodiment, the circuitry 202 may select a preset or configurable theme from among several preset or configurable themes, based on event information (such as weather-related events) or a user input/preference. The circuitry 202 may be configured to overlay an animation or a graphic item on the displayed images (i.e. the displayed one or more second images) based on the selected preset or configurable theme. Such themes may include, for example, graphics (for window styles or designs, window architectures, window shapes, or window materials), glass color and effects, animated objects (such as snow, rain, or firecrackers), color effects (such as color temperature changes), or a combination thereof. Also, such themes, when overlaid or applied on the displayed images, may make the first display screen 312 appear as if particular type of window is present on the wall 316 (i.e. a support structure) of the living environment 102. This may allow the electronic device 106 to maintain and/or enhance a user's viewing experience and add to an overall aesthetics of the living environment 102.

The first display screen 312 may dynamically be controlled to display the images of the outside environment, based on the head position and/or the first eye gaze of the first user 330. The first user 330 may experience a desired view of the outside environment from any specific location or direction in which a display screen and an image capturing device are present.

Figure 3B:
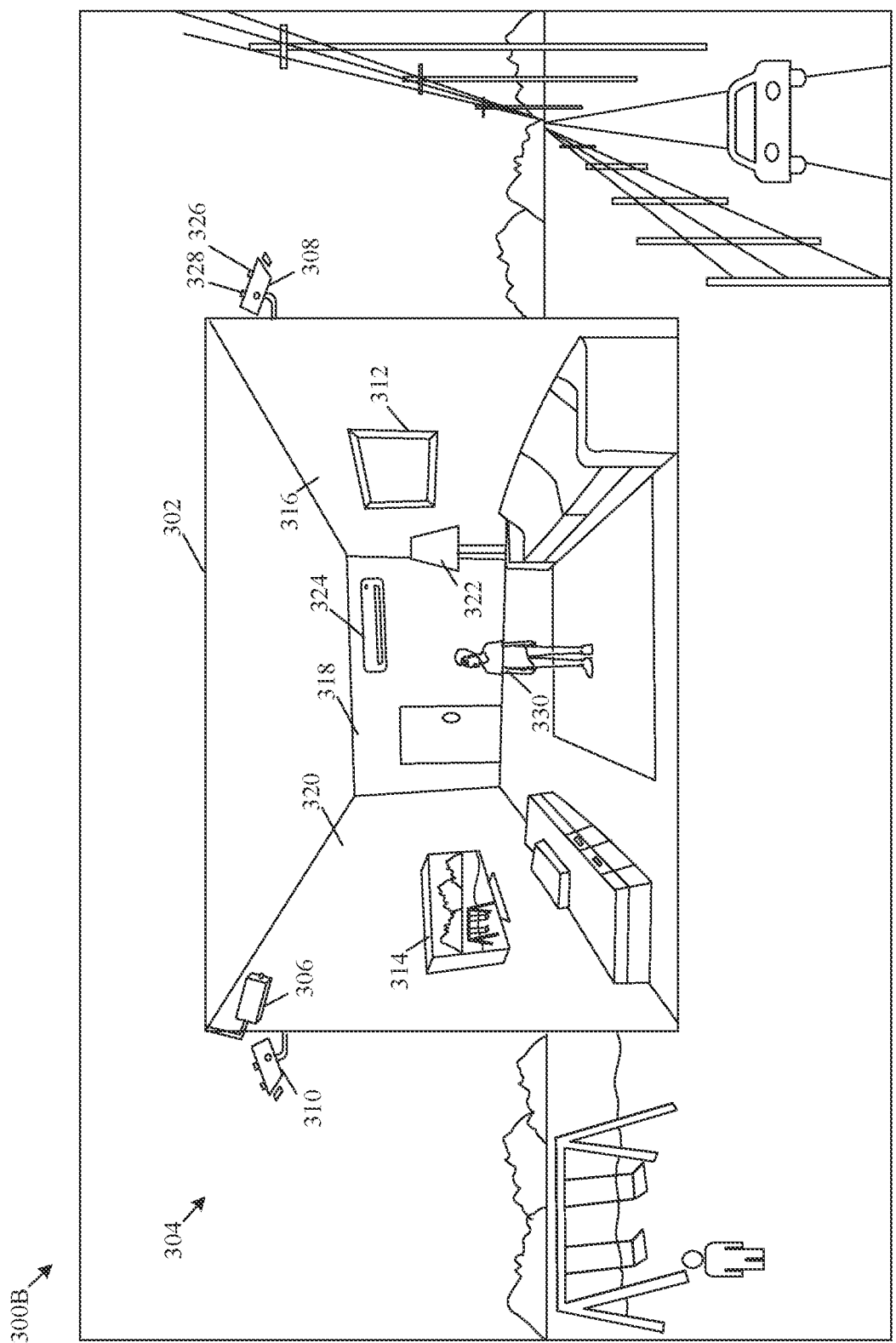
FIG. 3B is a diagram that illustrates an exemplary scenario for rendering content on displays in a living environment based on an environment outside the living environment, in accordance with an embodiment of the disclosure.

FIG. 3B is a diagram that illustrates an exemplary scenario for rendering content on displays in a living environment based on an environment outside the living environment, in accordance with an embodiment of the disclosure. FIG. 3B is explained in conjunction with elements from FIGS. 1, 2, and 3A. With reference to FIG. 3B, there is shown an exemplary scenario 300B. In the exemplary scenario 300B, there is shown the room 302 which may include the first image capturing device 306, the first display screen 312, the second display screen 314, the lighting device 322, and the air conditioner 324 (as described, for example, in FIG. 3A). In the exemplary scenario 300B, there is further shown the outside environment 304 which may include the second image capturing device 308, the third image capturing device 310, the temperature sensor 328, and the light sensor 326 (as described, for example, in FIG. 3A).

In FIG. 3B, there is further shown the first user 330, who may stand in the room 302 and may face the wall 320. In an embodiment, based on at least one of the tracked first head position or the first eye gaze, the circuitry 202 may be configured to select the third image capturing device 310 coupled with the electronic device 106. The third image capturing device 310 may be positioned outside the room 302 (in the outside environment 304) and on the wall 320. The circuitry 202 may be configured to receive one or more third images from the selected third image capturing device 310 and may control the second display screen 314 associated with the electronic device 106 to display the received one or more third images. The one or more third images may be captured from a viewpoint of the third image capturing device 310.

In an embodiment, the plurality of image capturing devices (such as the second image capturing device 308 and the third image capturing device 310) may be associated with a plurality of audio capturing devices (such as the plurality of audio capturing devices 118) positioned outside the living environment (such as the room 302). The circuitry 202 may be further configured to control a first audio capturing device (such as the first audio capturing device 118A), associated with the selected second image capturing device 308, to capture a first audio present in an environment outside to the room 302.

The circuitry 202 may be configured to receive first audio information associated with the captured first audio from the first audio capturing device 118A. The circuitry 202 may be further configured to control an audio reproduction device (such as the audio reproduction device 112) to reproduce the first audio based on received the first audio information. The first user 330 may hear the sound of the environment outside the room 302, which may enhance an experience of the first user 330 while viewing the displayed images on the second display screen 314.

In an embodiment, the circuitry 202 may be further configured to control the first display screen 312 or the audio reproduction device 112 associated with the electronic device 106 to render media content based on at least one of a current time of a day, a geographical location of the first user 330, or one or more objects present in the living environment (such as the room 302). For example, the media content may be rendered based on a current time of a day, such as a morning scene, an evening scene, or a nighttime. The first display screen 312 may display a scene corresponding to the current time of day and the audio reproduction device 112 may reproduce the audio information accordingly. In another example, the media content may be rendered based on a geographical location of the first user 330. The geographical location may be, for example, a specific beach, a rocky landscape, a mountain, a jungle, and the like. In another example, the media content may be rendered based on one or more objects present in the room 302. For instance, the circuitry 202 may detect a plurality of objects in the room 302 and may control the first display screen 312 to display the media content based on the detected plurality of objects. If the detected object is a coffee mug in the room 302, then the circuitry 202 may display media content which may be associated with the coffee mug. Such media content may include, for example, a morning scene, a café scene, or a restaurant scene. In another example, the circuitry 202 may detect objects such as, but not limited to a person, a decorative item, a food item, or combination thereof. For such objects, the circuitry 202 may display media content such as, but not limited to a party scene, a dance scene, or a romantic scene. Other examples of the media content may include, but are not limited to, one or more pre-stored images, one or more pre-stored audio content, one or more pre-stored graphics/animation content, first media content received from a user-device, or second media content received from a server (such as the server 126). The user device (not shown) may refer to a device associated with the first user 330, for example, a mobile phone, a smart phone, a tablet computing device, a personal computer, a gaming console, a media player, a sound system, a smart audio device, a home theatre system, a digital camera, or other consumer electronic devices with a media rendering capability.

In an embodiment, the circuitry 202 may be further configured to receive, from one or more sensors (such as the light sensor 326 and the temperature sensor 328) associated with the selected second image capturing device 308, environment information associated with the environment outside the living environment (such as the room 302). The environment information may include at least one of luminous intensity information, temperature information, or air flow information. The circuitry 202 may be configured to control an operation of one or more electronic devices (such as the air conditioner 324 and the lighting device 322) in the room 302 based on the received environment information. Examples of such electronic devices may include, but are not limited to, a lighting device, an electric fan, an air conditioner system, an electric heater, a thermostat device, an aroma diffuser device, or a Heating Ventilation and Air-Conditioning (HVAC) system. For example, the lighting device 322 may adjust the light intensity of the room 302 based on the outside environment. The electric fan (not shown) may adjust an air flow of the room 302 based on an air flow of the outside environment. The air conditioner 324 may adjust a temperature of the room 302 based on a temperature of the outside environment 304. The aroma diffuser device (not shown) may release aroma in the room 302 to match an aroma of the outside environment 304. The HVAC system (not shown) may include one or more vents which may introduce hot, cold, and/or dehumidified air in the room 302.

In an embodiment, the circuitry 202 may be configured to receive the environment information from the light sensor 326 or the temperature sensor 328 present in the environment outside the room 302. The environment information may be received in form of a analog or a digital signal from one or more sensors (such as the light sensor 326 or the temperature sensor 328). The light sensor 326 may include suitable logic, circuitry, and/or interfaces that may be configured to detect luminous intensity information of the outside environment 304. As shown in FIG. 3A, for example, the light sensor 326 may be positioned on the selected second image capturing device 308 to detect the luminous intensity information in the environment outside the room 302. The light sensor 326 may transmit a signal to the circuitry 202 to indicate the luminous intensity of the environment outside the room 302. The circuitry 202 may be configured to determine luminous intensity of the outside environment 304 based on the received signal from the light sensor 326. An example of the light sensor 326 may include, but is not limited to, photo resistors, photodiodes, photovoltaics, phototransistors, or photoelectric sensors.

The temperature sensor 328 may include suitable logic, circuitry, and/or interfaces that may be configured to detect temperature information in the outside environment 304. As shown in FIG. 3A, for example, the temperature sensor 328 may be positioned on the selected second image capturing device 308 to acquire the temperature information of the environment outside the room 302. The temperature sensor 328 may transmit a signal to the circuitry 202 to indicate the temperature (or a timeseries data of temperature values) of the environment outside the room 302. The circuitry 202 may be configured to determine the temperature of the outside environment 304 based on the received signal from the temperature sensor 328. For example, the circuitry 202 may receive the temperature information as 22 degrees Celsius and luminous intensity information as a categorical variable (for example, dim or low light) or a definite value (for example, 800 lumens). The circuitry 202 may be configured to control the air conditioner 324 to set the temperature of the room to 32 degrees Celsius and may turn on the lighting device 322 based on the received temperature information and the luminous intensity information, respectively.

In an embodiment, the circuitry 202 may be further configured to determine an emotional state of the first user 330 based on the detected first facial region of the first user 330. The first facial region of the first user 330 may be detected based on the received one or more first images of the room 302. Examples of the emotional state may include, but are not limited to, a happy emotion, a sad emotion, an angry emotion, a calm emotion, a fear emotion, a neutral emotion, an excited emotion, a confused emotion, a stressed emotion, a disgusted emotion, a surprised emotion, an excitement emotion, or a scared emotion. The first facial region (for example a face area) of the first user 330 may be indicative of an identity of the first user 330. In an embodiment, the memory 204 may be configured to store identification information (such as name, sample image, and/or user profile) of the first user 330. The circuitry 202 may recognize the first user 330 based on the detected first facial region and the stored identification information. Media content may be displayed on the first display screen 312 based on the identification information of the recognized first user 330.

Based on the determined emotional state of the first user 330, the circuitry 202 may be configured to select a third image capturing device (such as the third image capturing device 310) from the plurality of image capturing devices. Thereafter, the circuitry 202 may control the first display screen 312 to display one or more third images received from the third image capturing device 310. For example, the circuitry 202 may determine the media content as "a landscape movie" for a happy emotion, "a standup-comedy episode" for a sad emotion, "a beachside video blog" for a calm emotion, and "a party video" for an excited emotion.

In an embodiment, the circuitry 202 may be further configured to receive a user input indicative of a selection of an operational mode of the electronic device 106. The circuitry 202 may be configured to control an operation of the electronic device 106 based on the selected operational mode. The user input may be received via an input device, such as the first display screen 312 associated with the electronic device 106 or a TV remote, or a mobile device. The operational mode may include, for example, a TV mode or a window mode. Based on the user input, the circuitry 202 may be configured to control the operation of the electronic device 106 to switch to the TV mode or the window mode.

In an embodiment, the circuitry 202 may be configured to detect a presence of the first user 330 in the living environment (such as the room 302) based on the received one or more first images. The circuitry 202 may be further configured to control a power saving mode of the electronic device 106 based on the detected presence of the first user 330. For example, if the circuitry 202 detects that the first user 330 is absent in the living environment (such as the room 302) based on the received one or more first images, then the circuitry 202 may turn on the power saving mode of the electronic device 106. By turning on the power saving mode, the disclosed electronic device 106 may save power when there is no user in the living environment 102.

In an embodiment, the circuitry 202 may be configured to detect the presence of the first user 330 in the living environment (such as the room 302) based on an occupancy signal. Specifically, the circuitry 202 may be configured to receive the occupancy signal from the first image capturing device 306. The occupancy signal may refer to an electrical or digital signal transmitted from the first image capturing device 306 to the electronic device 106. The occupancy signal may indicate a presence of the first user 330 in the living environment 102.

In an embodiment, the circuitry 202 may be configured to control a power saving mode of the electronic device 106 based on at least one of the tracked first head position or the first eye gaze of the first user 330. As an example, the circuitry 202 may detect the presence of the first user 330 in the living environment (such as the room 302), but there may be no modification in the first head position or the first eye gaze of the first user 330 over a define period of time. This may imply that the first user 330 may have dozed off or may be sleeping in the room 302. In such a case, the circuitry 202 may be configured to turn on the power saving mode of the electronic device 106.

Figure 4:
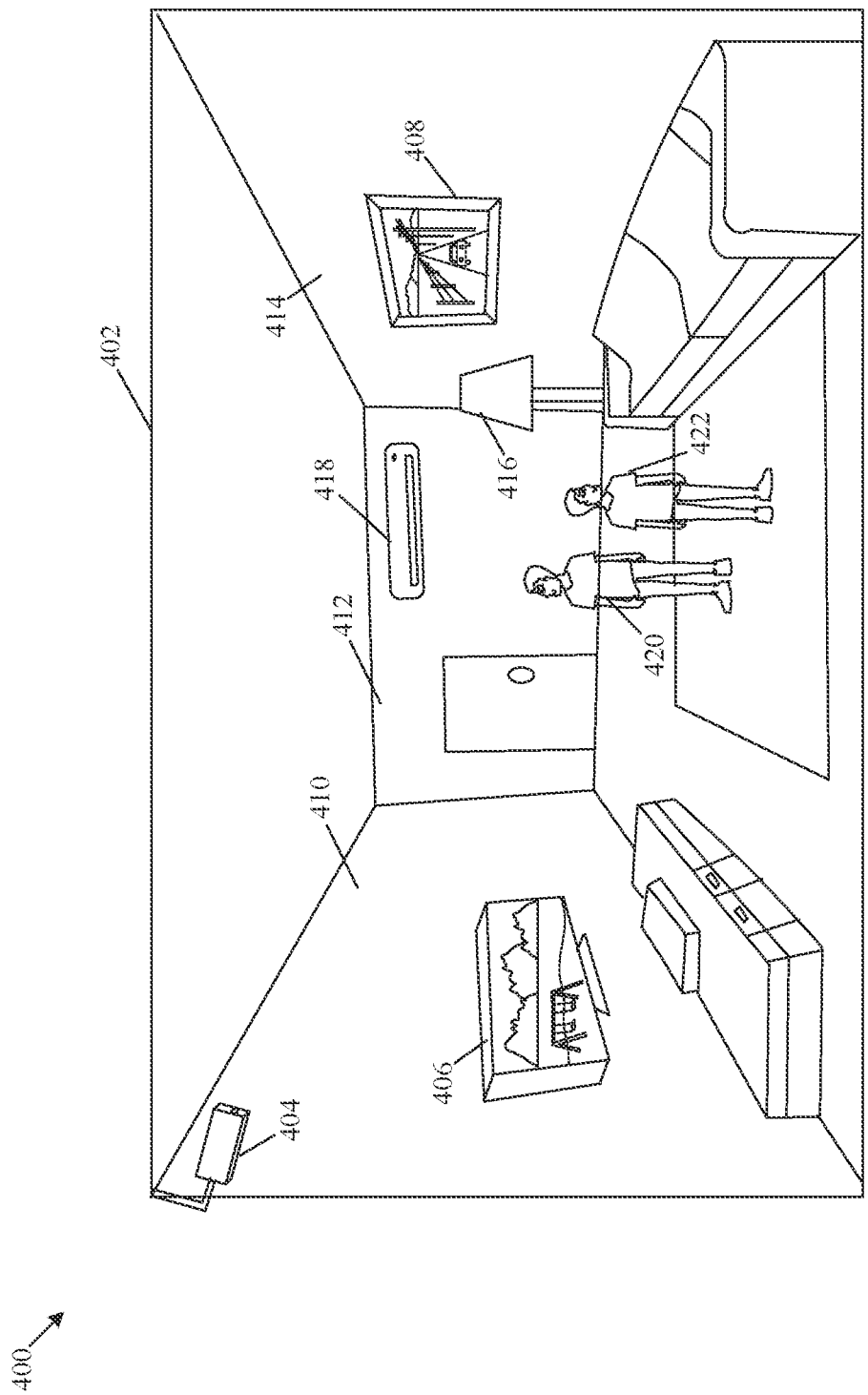
FIG. 4 is a diagram that illustrates an exemplary scenario for rendering content on displays in a living environment based on an environment outside the living environment, in accordance with an embodiment of the disclosure.

FIG. 4 is a diagram that illustrates an exemplary scenario for rendering content on displays in a living environment based on an environment outside the living environment, in accordance with an embodiment of the disclosure. FIG. 4 is explained in conjunction with elements from FIGS. 1, 2, 3A, and 3B. With reference to FIG. 4, there is shown an exemplary scenario 400. In the exemplary scenario 400, there is shown a room 402, which may be an example of the living environment 102. There is further shown a first image capturing device 404, which may be an exemplary implementation of the first image capturing device 108 of FIG. 1. There is further shown a plurality of display screens (such as a first display screen 406 and a second display screen 408), which may be an exemplary implementation of the plurality of display screens 110. There is further shown a plurality of electronic devices (such as a lighting device 416 and an air conditioner 418) which may be an exemplary implementation of the plurality of electronic devices 114.

In the scenario 400, there is further shown a first user 420 who may be standing in proximity of the first display screen 406. In the scenario 400, there is further shown a second user 422 who may be standing in proximity of the second display screen 408. In the scenario 400, there is further shown walls 410, 412, and 414 enclosing the living environment (such as the room 402). It should be noted that the lighting device 416 and the air conditioner 418 are merely examples of electronic devices. The scenario 400 may be applicable to other types of electronic devices, without a deviation from the scope of the disclosure.

In an embodiment, the circuitry 202 may be configured to receive one or more first images of the room 402 from the first image capturing device 404 (that may be coupled with the electronic device 106 and positioned inside the room 402). Based on the received one or more first images, the circuitry 202 may be configured to detect a first facial region of the first user 420 present in the room 402 (as also described, for example, in FIG. 3A). The circuitry 202 may be also configured to detect a second facial region of the second user 422 present in the room 402 based on the received one or more first images.

The circuitry 202 may be configured to track at least one of a first head position or a first eye gaze of the first user 420 based on the detected first facial region (as also described for example, in FIG. 3A). Similarly, the circuitry 202 may be configured to track at least one of a second head position or a second eye gaze of the second user 422 based on the detected second facial region. Based on tracking at least one of the first head position or the first eye gaze of the first user 420, the circuitry 202 may be configured to select a second image capturing device (such as the second image capturing device 308) from the plurality of image capturing devices 116 (as also described, for example, in FIG. 3A). Similarly, based on tracking at least one of the second head position or the second eye gaze of the second user 422, the circuitry 202 may be configured to select a third image capturing device (such as the third image capturing device 310) from the plurality of image capturing devices 116.

The circuitry 202 may be configured to receive one or more second images from the selected second image capturing device (as also described, for example, in FIG. 3A). Similarly, the circuitry 202 may be configured to receive one or more third images from the selected third image capturing device 310. Thereafter, the circuitry 202 may be configured to control the first display screen 406 associated with the electronic device 106 to display the received one or more second images (as also described, for example, in FIG. 3A). Similarly, the circuitry 202 may be configured to control the second display screen 408 to display the one or more third images received from the third image capturing device 310. The electronic device 106 allows for dynamic control of the display screens based on a respective viewing angle or head pose of the first user 420 and the second user 422.

Figure 5:
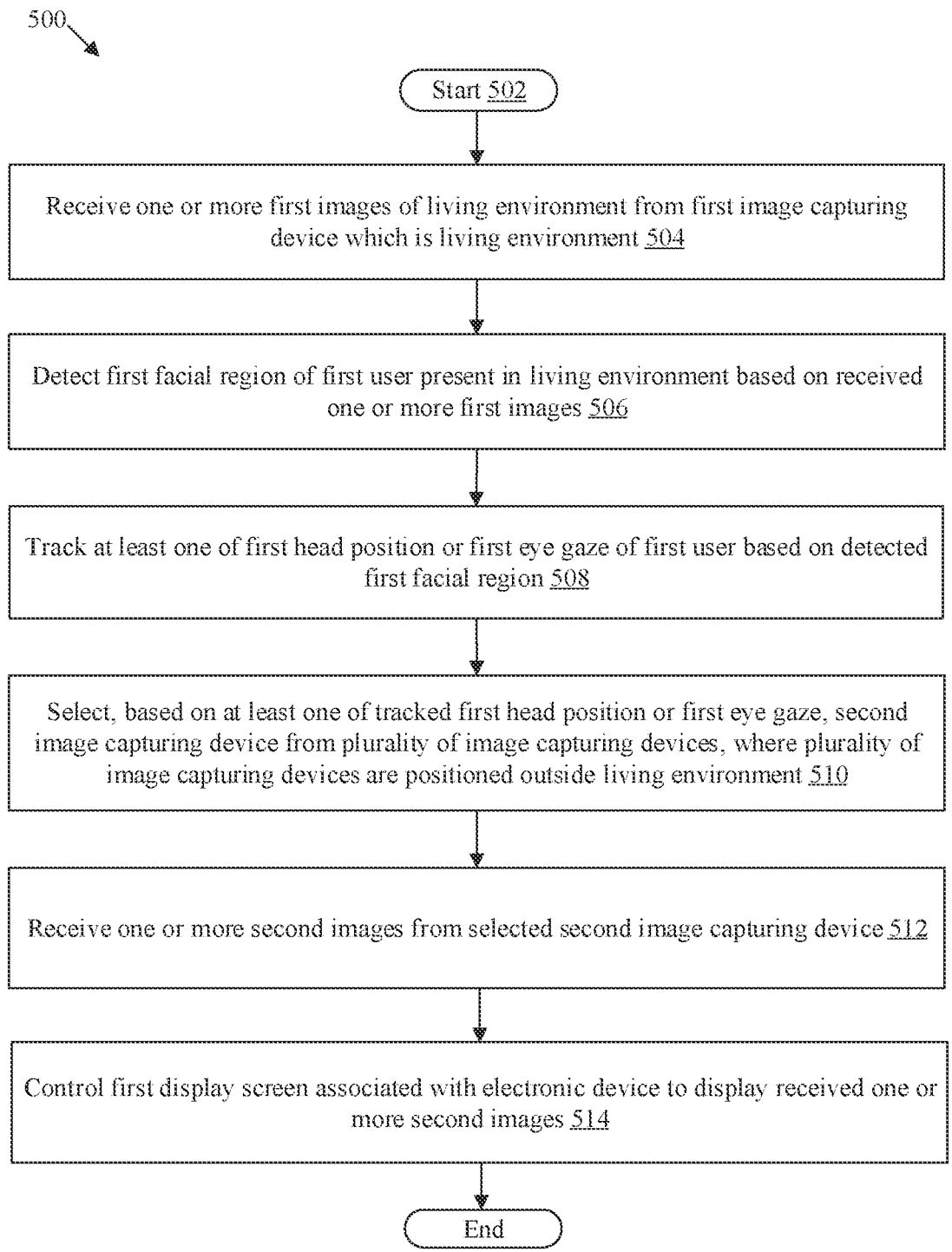
FIG. 5 is a flowchart that illustrates an exemplary method for rendering images of outside environment on displays in a living environment, in accordance with an embodiment of the disclosure.

FIG. 5 is a flowchart that illustrates an exemplary method for rendering images of outside environment on displays in a living environment, in accordance with an embodiment of the disclosure. FIG. 5 is explained in conjunction with elements from FIGS. 1, 2, 3A, 3B, and 4. With reference to FIG. 5, there is shown a flowchart 500. The operations of the flowchart 500 may be executed by a computing system, such as the electronic device 106 of FIG. 1 or FIG. 2. The operations may start at 502 and proceed to 504.

At 504, one or more first images of a living environment (such as the living environment 102) may be received. In one or more embodiments, the circuitry 202 may be configured to receive the one or more first images of the living environment 102 from the first image capturing device 108 which is coupled with the electronic device 106 and positioned inside the living environment 102, as described for example, in FIG. 3A.

At 506, a first facial region of a first user (such as the first user 124) present in the living environment 102 may be detected. In one or more embodiments, the circuitry 202 may be configured to detect the first facial region of the first user 124 present in the living environment 102 based on the received one or more first images, as described, for example, in FIG. 3A.

At 508, at least one of a first head position or a first eye gaze of the first user 124 may be tracked. In one or more embodiments, the circuitry 202 may be configured to track at least one of the first head position or the first eye gaze of the first user 124 based on the detected first facial region, as described, for example, in FIG. 3A.

At 510, a second image capturing device (such as the second image capturing device 122) from a plurality of image capturing devices (such as the plurality of image capturing devices 116) may be selected. In one or more embodiments, based on at least one of the tracked first head position or the first eye gaze, the circuitry 202 may be configured to select the second image capturing device 122 from the plurality of image capturing devices 116. The plurality of image capturing devices 116 may be positioned outside the living environment 102, as described, for example, in FIG. 3A.

At 512, one or more second images from the selected second image capturing device 122 may be received. In one or more embodiments, the circuitry 202 may be configured to receive the one or more second images from the selected second image capturing device 122, as described, for example, in FIG. 3A.

At 514, a first display screen (such as the first display screen 110A) may be controlled. In one or more embodiments, the circuitry 202 may be configured to control the first display screen 110A associated with the electronic device 106 to display the received one or more second images. Control may pass to end.

Although the flowchart 500 is illustrated as discrete operations, such as 504, 506, 508, 510, 512, and 514, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer (for example the electronic device 106). The instructions may cause the machine and/or computer (for example the electronic device 106) to perform operations that include retrieval of one or more first images of a living environment (for example, the living environment 102) from a first image capturing device (for example the first image capturing device 108) that may be coupled with the electronic device 106 and positioned inside the living environment 102. The operations may further include detection of a first facial region of a first user (for example the first user 124) present in the living environment 102 based on the received one or more first images. The operations may further include track of at least one of a first head position or a first eye gaze of the first user 124 based on the detected first facial region. The operations may further include selection of a second image capturing device (the second image capturing device 122) from a plurality of image capturing devices (for example, the plurality of image capturing devices 116) coupled with the electronic device 106, based on at least one of the tracked first head position or the first eye gaze of the first user 124. The plurality of image capturing devices 116 may be positioned outside the living environment 102. The operations may further include retrieval of a one or more second images from the selected second image capturing device 122. The operations may further include control of a first display screen (for example the first display screen 110A) associated with the electronic device 106 to display the received one or more second images.

Exemplary aspects of the disclosure may include an electronic device (such as the electronic device 106) that may include a circuitry (such as the circuitry 202). The circuitry 202 may be configured to receive one or more first images of a living environment (such as the living environment 102) from a first image capturing device (such as the first image capturing device 108) that may be coupled with the electronic device 106 and positioned inside the living environment 102. The circuitry 202 may be configured to detect a first facial region of a first user (such as the first user 124) present in the living environment 102 based on the received one or more first images. The circuitry 202 may be configured to track at least one of a first head position or a first eye gaze of the first user 124 based on the detected first facial region. Based on at least one of the tracked first head position or the first eye gaze of the first user 124, the circuitry 202 may be configured to select a second image capturing device (such as the second image capturing device 122) from a plurality of image capturing devices (such the plurality of image capturing devices 116) coupled with the electronic device 106. The plurality of image capturing devices 116 may be positioned outside the living environment 102. The circuitry 202 may be further configured to receive one or more second images from the selected second image capturing device 122 and control a first display screen (such as the first display screen 110A) associated with the electronic device 106 to display the received one or more second images.

In accordance with an embodiment, based on at least one of the tracked first head position or the first eye gaze of the first user 124, the circuitry 202 may be further configured to control the selected second image capturing device 122 to capture the one or more second images of an environment outside the living environment 102.

In accordance with an embodiment, the circuitry 202 may be further configured to determine a first viewing direction of the first user 124 based on at least one of the tracked first head position or the first eye gaze. The viewing direction may be towards a wall (such as the wall 318) of the living environment (such as the room 302) and the selected second image capturing device 308 may be positioned on the wall 318.

In accordance with an embodiment, the circuitry 202 may be further configured to detect a second facial region of a second user (such as the second user 422) present in the living environment (such as the room 402), based on the received one or more first images. The circuitry 202 may be configured to track at least one of a second head position or a second eye gaze of the second user 422 based on the detected second facial region. Based the at least one of the tracked second head position or the second eye gaze of the second user 422, the circuitry 202 may be further configured to select a third image capturing device from the plurality of image capturing devices 116. The circuitry 202 may be configured to control the first display screen 110A to display the received one or more second images and one or more third images received from the third image capturing device.

In accordance with an embodiment, the circuitry 202 may be further configured to select the first display screen 110A from a plurality of display screens (such as the plurality of display screens 110) based on at least one of the tracked first head position or the first eye gaze of the first user 124.

In accordance with an embodiment, the plurality of image capturing devices 116 may be associated with a plurality of audio capturing devices (such as the plurality of audio capturing devices 118) positioned outside the living environment 102. The circuitry 202 may be configured to control a first audio capturing device (such as the first audio capturing device 118A), associated with the selected second image capturing device 122, to capture a first audio present in an environment outside the living environment 102. The circuitry 202 may be further configured to receive first audio information associated with the captured first audio from the first audio capturing device 118A. Based on received the first audio information, the circuitry 202 may be further configured to control an audio reproduction device (such as the audio reproduction device 112) associated with the electronic device 106 to reproduce the first audio.

In accordance with an embodiment, the circuitry 202 may be further configured to receive, from one or more sensors (such as the plurality of sensors 120) associated with the selected second image capturing device 122, environment information associated with an environment outside the living environment 102. The environment information may include at least one of: luminous intensity information, temperature information, or air flow information. Based on the received environment information, the circuitry 202 may be further configured to control an operation of one or more electronic devices (such as the one or more electronic devices 114) in the living environment 102.

In accordance with an embodiment, the one or more electronic devices 114 may include at least one of a lighting device, an electric fan, or an air conditioner system, an electric heater, a thermostat device, an aroma diffuser device, or a Heating Ventilation and Air-Conditioning (HVAC) system In accordance with an embodiment, the circuitry 202 may be further configured to control the first display screen 110A or an audio reproduction device 112 associated with the electronic device 106 to render media content based on at least one of a current time of a day, a geographical location of the first user 124, or one or more objects present in the living environment 102. In accordance with an embodiment, the media content may include at least one of: one or more pre-stored images, one or more pre-stored audio content, one or more pre-stored graphics/animation content, first media content received from a user-device, or second media content received from a server (such as the server 126).

In accordance with an embodiment, the circuitry 202 may be further configured to determine an emotional state of the first user 124 based on the detected facial region of the first user 124. Based on the determined emotional state of the first user 124, the circuitry 202 may be configured to select a third image capturing device from the plurality of image capturing devices 116. The circuitry 202 may be further configured to control the first display screen 110A to display one or more third images received from the third image capturing device.

In accordance with an embodiment, the circuitry 202 may be further configured to receive a user input indicative of a selection of an operational mode of the electronic device 106. Based on the selected operational mode, the circuitry 202 may be further configured to control an operation of the electronic device 106.

In accordance with an embodiment, the circuitry 202 may be further configured to detect a presence of the first user 124 in the living environment 102 based on the received one or more first images. Based on the detected presence of the first user 124, the circuitry 202 may be further configured to control a power saving mode of the electronic device 106. In accordance with an embodiment, the circuitry 202 may be further configured to control a power saving mode of the electronic device 106 based on at least one of the tracked first head position or the first eye gaze of the first user 124.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
 circuitry communicatively coupled to:
  a first image capturing device which is inside a living environment, and
  a plurality of image capturing devices that is outside the living environment, wherein
  the plurality of image capturing devices includes a second image capturing device and a third image capturing device, and
  the circuitry is configured to:
   receive at least one first image of the living environment from the first image capturing device;
   detect a first facial region of a first user present inside the living environment, wherein the first facial region is detected based on the received at least one first image;
   determine an emotional state of the first user based on the detected first facial region;
   select, based on the determined emotional state of the first user the third image capturing device from the plurality of image capturing devices to capture at least one image of an environment outside the living environment;
   receive the at least one image from the selected third image capturing device; and
   control a display screen, associated with the electronic device and inside the living environment, to display the at least one image received from the selected third image capturing device.

2. The electronic device according to claim 1, wherein the circuitry is further configured to:
 track at least one of a first head position or a first eye gaze of the first user based on the detected first facial region;
 select the second image capturing device based on the tracked at least one of the first head position or the first eye gaze; and control the selected second image capturing device to capture at least one second image of the environment outside the living environment.

3. The electronic device according to claim 2, wherein
the circuitry is further configured to determine a viewing direction of the first user based on the tracked at least one of the first head position or the first eye gaze, and
the viewing direction is towards a wall of the living environment and the selected second image capturing device is positioned on the wall.

4. The electronic device according to claim 2, wherein the circuitry is further configured to:
detect a second facial region of a second user present in the living environment, wherein the second facial region is detected based on the received at least one first image;
track at least one of a second head position or a second eye gaze of the second user based on the detected second facial region;
select, based on the tracked at least one of the second head position or the second eye gaze of the second user, the third image capturing device from the plurality of image capturing devices;
receive the at least one second image from the second image capturing device and at least one third image from the selected third image capturing device; and
control the display screen to display the received at least one second image and the received at least one third image.

5. The electronic device according to claim 2, wherein the circuitry is further configured to select the display screen from a plurality of display screens based on the tracked at least one of the first head position or the first eye gaze of the first user.

6. The electronic device according to claim 2, wherein
the plurality of image capturing devices is associated with a plurality of audio capturing devices positioned outside the living environment, and
the circuitry is further configured to:
control a first audio capturing device of the plurality of audio capturing devices to capture a first audio present in the environment outside the living environment, wherein the first audio capturing device is associated with the selected second image capturing device;
receive first audio information associated with the captured first audio from the first audio capturing device; and
control an audio reproduction device associated with the electronic device to reproduce the first audio, wherein the audio reproduction device is controlled based on the received first audio information.

7. The electronic device according to claim 2, wherein the circuitry is further configured to:
receive, from at least one sensor associated with the selected second image capturing device, environment information associated with the environment outside the living environment, wherein the environment information includes at least one of luminous intensity information, temperature information, or air flow information; and
control an operation of at least one specific electronic device in the living environment based on the received environment information.

8. The electronic device according to claim 7, wherein the at least one specific electronic device includes at least one of a lighting device, an electric fan, an air conditioner system, an electric heater, a thermostat device, an aroma diffuser device, or a Heating Ventilation and Air-Conditioning (HVAC) system.

9. The electronic device according to claim 1, wherein the circuitry is further configured to control the first display screen or an audio reproduction device associated with the electronic device to render media content based on at least one of a current time of a day, a geographical location of the first user, or at least one object present in the living environment.

10. The electronic device according to claim 9, wherein the media content comprises at least one of at least one pre-stored image, at least one pre-stored audio content, at least one pre-stored graphics/animation content, first media content from a user-device, or second media content from a server.

11. The electronic device according to claim 1, wherein the circuitry is further configured to:
receive a user input indicative of a selection of an operational mode of the electronic device; and
control an operation of the electronic device based on the selected operational mode.

12. The electronic device according to claim 1, wherein the circuitry is further configured to:
detect a presence of the first user in the living environment based on the received at least one first image; and
control a power saving mode of the electronic device based on the detected presence of the first user.

13. The electronic device according to claim 2, wherein the circuitry is further configured to control a power saving mode of the electronic device based on the tracked at least one of the first head position or the first eye gaze of the first user.

14. A method, comprising:
in an electronic device that is communicatively coupled to a first image capturing device which is inside a living environment, and a plurality of image capturing devices that is outside the living environment, wherein the plurality of image capturing devices includes a second image capturing device and a third image capturing device:
receiving at least one first image of the living environment from the first image capturing device;
detecting a first facial region of a first user present inside the living environment, wherein the first facial region is detected based on the received at least one first image;
determining an emotional state of the first user based on the detected first facial region;
selecting, based on the determined emotional state of the first user, the third image capturing device from the plurality of image capturing devices to capture at least one image of an environment outside the living environment;
receiving the at least one image from the selected third image capturing device; and
controlling a display screen, associated with the electronic device and inside the living environment, to display the at least one image received from the selected third image capturing device.

15. The method according to claim 14, further comprising:
tracking at least one of a first head position or a first eye gaze of the first user based on the detected first facial region;

selecting the second image capturing device based on the tracked at least one of the first head position or the first eye gaze; and controlling the selected second image capturing device to capture at least one second image of the environment outside the living environment.

16. The method according to claim 15, further comprising determining a viewing direction of the first user based on the tracked at least one of the first head position or the first eye gaze, wherein the viewing direction is towards a wall of the living environment and the selected second image capturing device is positioned on the wall.

17. The method according to claim 15, further comprising:

receiving, from at least one sensor associated with the selected second image capturing device, environment information associated with the environment outside the living environment, wherein the environment information includes at least one of luminous intensity information, temperature information, or air flow information; and controlling an operation of at least one specific electronic device in the living environment based on the received environment information.

18. A non-transitory computer-readable medium having stored thereon, computer-executable instructions that when executed by an electronic device, causes the electronic device to execute operations, the operations comprising:

receiving at least one image of a living environment from a first image capturing device-which is inside the living environment, wherein the electronic device is communicatively coupled to the first image capturing device which is inside the living environment, and a plurality of image capturing devices that is outside the living environment, and the plurality of image capturing devices includes a second image capturing device and a third image capturing device;

detecting a facial region of a user present inside the living environment, wherein the facial region is detected based on the received at least one image;

determining an emotional state of the user based on the detected facial region;

selecting, based on the determined emotional state of the user, the third image capturing device from the plurality of image capturing devices to capture at least one image of an environment outside the living environment;

receiving the at least one image from the selected third image capturing device; and controlling a display screen, associated with the electronic device and inside the living environment, to display the at least one image received from the selected third image capturing device.

19. The electronic device according to claim 2, wherein determine a location in the living environment based on the tracked at least one of the first head position or the first eye gaze;

determine that a relative distance of the second image capturing device among the plurality of image capturing devices is minimum with respect to the determined location; and select the second image capturing device based on the determination that relative distance of the second image capturing device is minimum with respect to the determined location.

* * * * *